July 23, 1940.　　J. S. LOCKE　　2,208,562
AUTOMATIC CONTROL SYSTEM
Filed Nov. 23, 1936
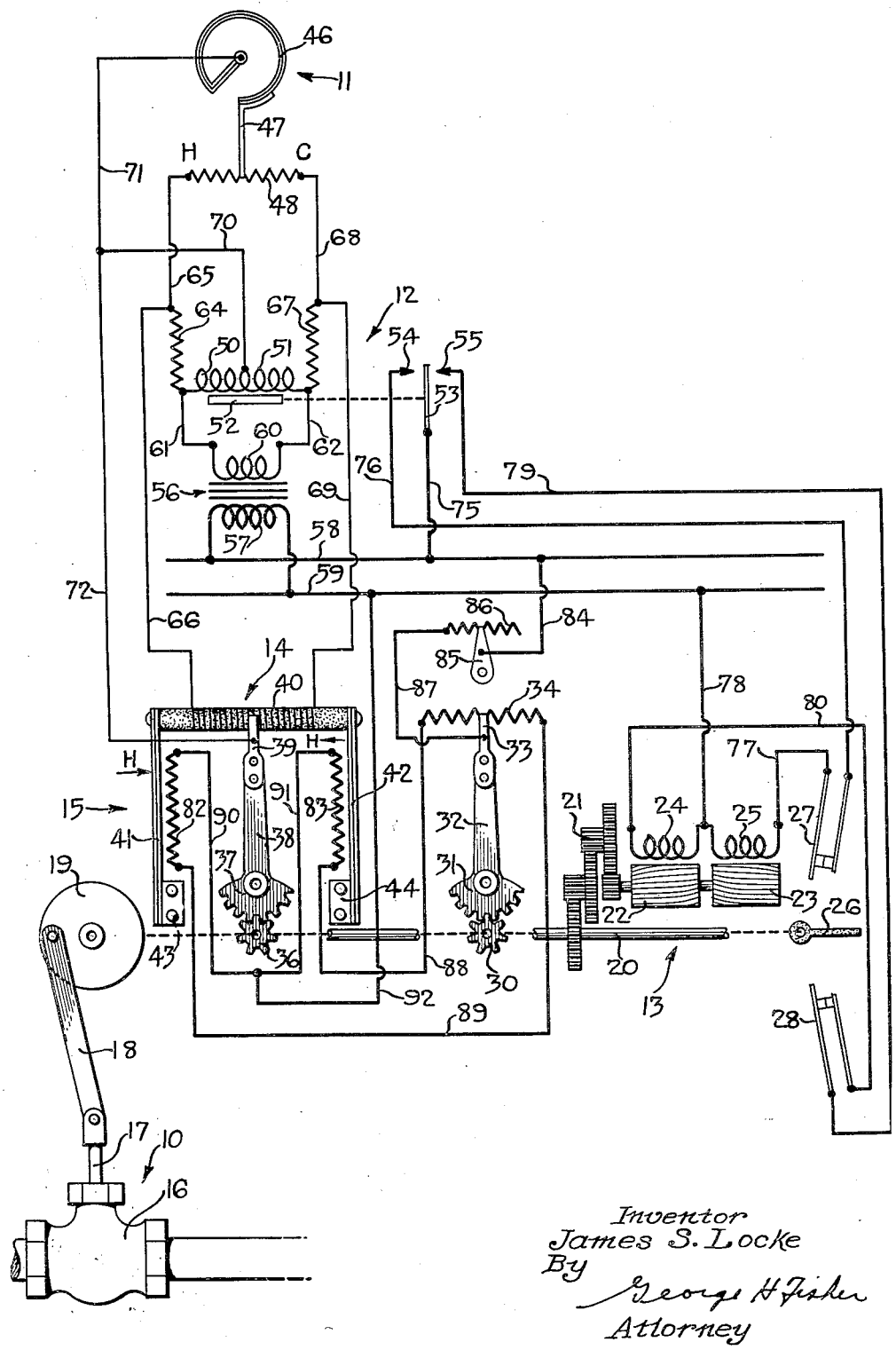
Inventor
James S. Locke
By
George H Fisher
Attorney Patented July 23, 1940

2,208,562

UNITED STATES PATENT OFFICE 2,208,562

AUTOMATIC CONTROL SYSTEM

James Scarth Locke, Minneapolis, Minn., assignor to Minneapolis-Honeywell Regulator Company, Minneapolis, Minn., a corporation of Delaware Application November 23, 1936, Serial No. 112,326

12 Claims. (Cl. 236—78)

This invention relates to automatic control systems in general and more particularly to a control system of the follow-up type wherein there is provided an automatic reset or load compensation mechanism.

An object of this invention is to provide a follow-up control system for controlling the value of a condition along with a novel reset or load compensation mechanism for altering the action of the follow-up means of the follow-up control system to maintain the value of the condition to be controlled at the desired normal value regardless of changes in load.

A further object of this invention is to provide a thermo-electrically operated reset mechanism for altering the action of a follow-up means of a follow-up control system.

Other objects and advantages will become apparent to those skilled in the art upon reference to the accompanying specification, claims and drawing.

For a more thorough understanding of this invention, reference is made to the accompanying single sheet of drawings in which is diagrammatically disclosed the preferred form of my invention.

Referring now to the drawing, a device to be positioned in a plurality of positions for controlling the value of a condition to be controlled is generally designated at 10. A control means the state of which is varied in accordance with changes in the value of the condition to be controlled is generally designated at 11. The control means 11 is adapted to operate a relay means generally designated at 12 which, in turn, positions a motor generally designated at 13. The motor 13 positions the device 10 and operates a follow-up means generally designated at 14. The action of the follow-up means 14 is altered by means of a reset or load compensation mechanism generally designated at 15.

Although the control system of this invention may be utilized for controlling any condition desired, it is shown for purposes of illlustration as controlling a temperature condition and more particularly the temperature of a space (not shown). Therefore, the device 10 to be positioned in a plurality of positions is shown to comprise a valve 16 for controlling the supply of heating fluid to the space (not shown). The valve 16 is operated by a valve stem 17 which is connected by a pitman 18 to a crank disc 19 carried by a shaft 20 of the motor 13. The shaft 20 is operated through a reduction gear train 21 by motor rotors 22 and 23. The rotors 22 and 23 are, in turn, operated by field windings 24 and 25. The arrangement is such that when the field winding 25 is energized, the valve 16 is moved towards an open position and when the field winding 24 is energized the valve 16 is moved towards a closed position. The shaft 20 also operates an abutment member 26 preferably made of insulating material which is adapted to open limit switches 27 and 28 when the valve 16 is moved to an extreme open position or an extreme closed position, respectively.

The shaft 20 also operates a gear 30 which meshes with a gear segment 31 carried by a lever 32. The lever 32 carries a slider 33 adapted to slide across a resistance element 34. The shaft 20 also carries a gear 36 which meshes with a gear segment 37 carried by a lever 38. The lever 38 carries a slider 39 which is adapted to slide across a resistance element 40. The slider 39 and the resistance element 40 form a balancing potentiometer, the operation of which will be pointed out more fully hereafter. When the valve 16 is moved toward an open position, the sliders 33 and 39 are moved toward the left and when the valve 16 is moved toward a closed position the sliders 33 and 39 are moved toward the right. The potentiometer resistance element 40 is carried by two thermostatic elements 41 and 42 which are suitably anchored to supports 43 and 44, respectively.

The control mechanism generally designated at 11 is shown to be a temperature responsive control means having a thermostatic element 46 responsive to variations in space temperature. Thermostatic element 46 operates a slider 47 with respect to a control resistance element 48. Upon an increase in space temperature, the slider 47 is moved toward the left in the direction indicated by the character H, and upon a decrease in space temperature, the slider 47 is moved to the right in the direction indicated by the character C. The parts are so arranged that when the space temperature is at the desired normal value, the slider 47 is in a mid position as shown in the drawing. This mid position represents the normal state of the control means 11.

The relay generally designated at 12 may comprise relay coils 50 and 51 for operating an armature 52 which is suitably connected to a switch arm 53. The switch arm 53 is adapted to engage spaced contacts 54 and 55. When the relay coil 50 is energized more than the relay coil 51, the switch arm 53 is moved into engagement with the contact 54, and when the relay coil 51 is energized more than the relay coil 50, the switch arm 53 is moved into engagement with contact 55. When the relay coils 50 and 51 are equally energized, the switch arm 53 is maintained spaced from the contacts 54 and 55 in the position shown in the drawing. Power is supplied to the relay 12 by means of a step-down transformer 56 having a primary 57 connected across the line wires 58 and 59 and a secondary 60. One end of the secondary 60 is connected by a wire 61 to the left end of the relay coil 50 and the other end of the secondary 60 is connected by a wire 62 to the right end of the relay coil 51. The adjacent ends of the relay coils 50 and 51 are connected together. By reason of these connections, the relay coils 50 and 51 are connected in series and across the secondary 60.

The left end of the relay coil 50 is connected by a protective resistance 64 and wires 65 and 66 to the left ends of the control potentiometer resistance element 48 and the balancing potentiometer resistance element 40. The right end of the relay coil 51 is connected by a protective resistance 67 and wires 68 and 69 to the right ends of the control potentiometer resistance 48 and the balancing potentiometer resistance element 40. The junction of the relay coils 50 and 51 is connected by wires 70, 71 and 72 to the slider 47 of the control potentiometer and to the slider 39 of the balancing potentiometer. By reason of these wiring connections, it is seen that the control potentiometer, the balancing potentiometer and the series connected relay coils are all connected in parallel and across the secondary 60 of the step-down transformer 56.

Omitting for the present the operation of the thermostatic elements 41 and 42, it is assumed that the space temperature is at the normal desired value and, therefore, the slider 47 is in a mid position. Also, it is assumed that the valve 16 is in a mid position and the slider 39 of the balancing potentiometer is in a mid position and that just the correct amount of heat is being supplied to the space to make up for the heat losses from the space. With the parts in these positions, the relay coils 50 and 51 are equally energized and the switch arm 53 is spaced midway between the contacts 54 and 55. Upon a decrease in space temperature caused by an increase in the heating load, the slider 47 is moved to the right in the direction indicated by the character C. By reason of the above referred to parallel relationship, this right-hand movement of the slider 47 causes partial short circuiting of the relay coil 51 to decrease the energization thereof and to increase the energization of the relay coil 50. This causes movement of the switch arm 53 into engagement with the contact 54 to complete a circuit from the line wire 58 through wire 75, switch arm 53, contact 54, wire 76, limit switch 27, wire 77, field winding 25, and wire 78 back to the other line wire 59. Completion of this circuit energizes the field winding 25 to move the valve 16 towards an open position and increase the supply of heat to the space. Operation of the motor 13 to move the valve 16 towards an open position also causes left-hand movement of the slider 39 with respect to the balancing potentiometer resistance element 40. This left-hand movement of the slider 39 causes partial short circuiting of the relay coil 50 to decrease the energization thereof and to increase the energization of the relay coil 51. When the slider 39 has moved sufficiently far to the left to rebalance the energizations of the relay coils 50 and 51, the switch arm 53 is moved out of engagement with the contact 54 to break the circuit through the field winding 25 of the motor 13. Further opening movement of the valve 16 is, therefore, prevented and the valve 16 is held in this newly adjusted position. In this manner, the valve 16 is modulated toward an open position in direct accordance with the amount of decrease in space temperature.

Upon an increase in space temperature caused by a decrease in the heating load, the slider 47 is moved to the left in the direction indicated by the character H. This causes partial short circuiting of the relay coil 50 to decrease the energization thereof and to increase the energization of the relay coil 51. These unequal energizations of the relay coils 50 and 51 move the switch arm 53 into engagement with the contact 55 to complete a circuit from the line wire 58, through wire 75, switch arm 53, contact 55, wire 79, limit switch 28, wire 80, field winding 24, and wire 78 back to the other line wire 59. Completion of this circuit causes energization of the field winding 24 to move the valve 16 towards a closed position to decrease the supply of heat being delivered to the space. Operation of the motor 13 to move valve 16 towards a closed position causes right-hand movement of the slider 39 of the balancing potentiometer. This right-hand movement of the slider 39 causes partial short circuiting of the relay coil 51 to decrease the energization thereof and to increase the energization of the relay coil 50. When the slider 39 has moved sufficiently far to the right to rebalance the energization of the relay coils 50 and 51, the switch arm 53 is moved out of engagement with the contact 55 and further closing movement of the valve 16 is prevented. In this manner, valve 16 is modulated toward a closed position in direct accordance with the amount of increase in space temperature.

By reason of the above follow-up system, the valve 16 is modulated in accordance with deviations in space temperature from the desired normal value. It is found that if the control range of the controller 11 is made sufficiently narrow to give accurate control, "hunting" sometimes occurs and if the control range is made sufficiently wide to prevent "hunting" a "droop" in the control system becomes quite apparent, that is, as the heating load increases the temperature maintained by the control system decreases. In order to prevent "hunting" and to prevent "drooping" of the control system, the reset mechanism generally designated at 15 is utilized. This reset mechanism acts to maintain the temperature at a substantially constant value regardless of changes in the heating load.

The thermostatic elements 41 and 42 which support the resistance element 40 of the balancing potentiometer form part of the reset mechanism. Upon a temperature increase these thermostatic elements 41 and 42 flex inwardly in a direction indicated by the arrows designated H. The thermostatic elements 41 and 42 are heated by heaters 82 and 83. The arrangement is such that when the heaters 82 and 83 are equally energized, the resistance element 40 is maintained in a central position, when the heating element 82 is energized more than the heating element 83, the resistance element 40 is moved towards the right, and when the heating element 83 is energized more than the heating element 82, the resistance element 40 is moved towards the left. The amount that the resistance element 40 is moved towards the left or towards the right is dependent upon the relative energizations of the heaters 82 and 83.

A wire 84 connects the line wire 58 to a slider 85 of a manually operated rheostat, the rheostat being formed by the slider 85 and a resistance element 86. The resistance element 86 is connected by a wire 87 to the slider 33 operated by the motor 13. The left end of the resistance element 34 cooperating with the slider 33 is connected by a wire 88 to the lower end of the heater 83 and in a like manner the right end of the resistance element 34 is connected by a wire 89 to the lower end of the heater 82. The upper ends of the heaters 82 and 83 are connected together by wires 90 and 91 and by a wire 92 to the line wire 59. By reasons of these wiring connections, it is obvious that when the slider 33 is in the mid position the heaters 82 and 83 are equally energized, and when the slider 33 is moved towards the left the energization of the heater 83 increases and the energization of the heater 82 decreases. Likewise, when the slider 33 is moved toward the right, the energization of the heater 82 is increased and the energization of the heater 83 is decreased. It is, therefore, apparent that when the slider 33 moves towards the left the resistance element 40 moves towards the left, and when the slider 33 moves towards the right the resistance element 40 moves towards the right. Since it takes some time for the change in the energizations or the change in the heating effects of the heaters 82 and 83 to affect the thermostatic elements 41 and 42, the resistance element 40 will not immediately move in the direction that the slider 33 moves but will remain in its position for a time interval and then move to the position corresponding to the new position of the slider 33. In other words, there is a time delay between the movement of the slider 33 and the movement of the resistance element 40 of the balancing potentiometer. The amount of time delay may be controlled by the manual rheostat comprised of the slider 85 and the resistance 86.

Assume now that the parts are in the position shown in the drawing, an increase in heating load causes a decrease in space temperature to move the slider 47 towards the right. This decreases the energization of the relay coil 51 and increases the energization of the relay coil 50 to move the switch arm 53 into engagement with the contact 54 to move the valve 16 toward an open position in an amount proportional to the amount of decrease in space temperature. Movement of the valve 16 toward an open position causes left-hand movement of the slider 39 to rebalance the energizations of the relay coils 50 and 51. Movement of the valve 16 toward an open position also causes left-hand movement of the slider 33 to increase the energization of the heater 83 and decrease the energization of the heater 82, and after a time delay the resistance element 40 is moved towards the left with respect to the slider 39. This movement of the resistance element 40 towards the left partially short-circuits the relay coil 51 to decrease the energization thereof and to increase the energization of the relay coil 50. This causes movement of the switch arm 53 into engagement with the contact 54 to move the valve 16 further towards an open position and also causes left-hand movement of the slider 39 to rebalance the relay 12. Movement of the valve 16 towards an open position causes left-hand movement of the slider 33 to increase the energization of the heater 83 and to decrease the energization of the heater 82 which will again move the valve 16 further towards an open position. This increased movement of the valve 16 towards an open position increases the supply of heat to the space to restore the space temperature to the desired normal value, and when the space temperature is restored to the desired normal value, the slider 47 of the control potentiometer is moved toward the mid position and the relay coils 50 and 51 become equally energized and the valve 16 is maintained in a new position with respect to the position of the slider 47. In other words, the valve 16 is positioned or reset farther towards an open position in accordance with the increase in heating load.

Upon a decrease in heating load, the space temperature increases to move the slider 47 to the left which causes partial short circuiting of the relay coil 50 to decrease the energization thereof and to increase the energization of the relay coil 51. This causes movement of the valve 16 towards a closed position in accordance with the amount of increase in space temperature. Movement of the valve 16 towards a closed position causes right-hand movement of the slider 33 which increases the heating effect of the heater 82 and decreases the heating effect of the heater 83 and the resistance element 40 is moved towards the right. Movement of the resistance element 40 towards the right partially short-circuits the relay coil 50 to decrease the energization thereof and to increase the energization of the relay coil 51 and this causes further movement of the valve 16 towards a closed position. In this manner, the valve 16 is repositioned or reset further towards a closed position with respect to the position of the control potentiometer in accordance with the amount of decrease in the heating load. The space temperature, therefore, is restored to the desired normal value and is maintained at the desired normal value regardless of a decrease in load on the heating system.

From the above it is seen that I have provided a follow-up control system for controlling the value of a condition along with an automatic load compensation or a reset mechanism of novel character which overcomes the "drooping" characteristic of the follow-up control system to maintain the value of the condition to be controlled at the desired normal value regardless of changes in load affecting the condition. Means are provided for varying the heating effect of the heaters 82 and 83 whereby the rate at which the device to be positioned in a plurality of positions is reset to maintain the condition at the normal desired value may be adjusted.

Although for purposes of illustration I have disclosed one form of my invention, other forms may become obvious to those skilled in the art upon reviewing this specification and, therefore, this invention is to be limited only by the scope of the appended claims and prior art.

I claim as my invention:

1. In combination, a device to be positioned in a plurality of positions for controlling the value of a condition, control means the state of which is varied in accordance with changes in the value of the condition, and having a normal state corresponding to a desired normal value of the condition, means, including follow-up means operated by said device, controlled by said control means for positioning said device in accordance with changes in the value of the condition to be controlled, said follow-up means including a relatively stationary member and a movable member, means connecting the movable member with said device for operation thereby, and thermo-electric means for moving the relatively stationary member as an incident to deviation of the value of the condition to be controlled from the desired normal value to return the value of the condition to be controlled toward the desired normal value.

2. In combination, a device to be positioned in a plurality of positions to control the value of a condition, control resistance means, means responsive to changes in the value of the condition to be controlled for adjusting the control resistance means, relay means for controlling the operation of the device, balancing resistance means including a resistance member and a slider member, thermostatic means for mounting one of the members, means for operating the other member upon operation of the device, heating means for the thermostatic means, means controlled by said device for varying the heating effect of the heating means, and connections between the control resistance means, the balancing resistance means and the relay means.

3. A combined reset and follow-up mechanism for a device which controls the value of a condition comprising in combination, a member, an element movable with respect to the member for performing a control function, means for operating the element upon operation of the device, a pair of thermostatic elements arranged in opposition to each other for moving the member with respect to the element, a heater for each thermostatic element, and adjustable resistance means in control of said heaters for varying the heating effect of the heaters, the arrangement being such that when the heating effect of one is increased the heating effect of the other is decreased.

4. In combination, a device to be positioned in a plurality of positions for controlling the value of a condition, control means the state of which is varied in accordance with changes in the value of the condition, and having a normal state corresponding to a desired normal value of the condition, means, including follow-up means operated by said device, controlled by said control means for positioning said device in accordance with changes in the value of the condition to be controlled, thermo-electric means for additionally and directly operating said follow-up means, and means operative as an incident to deviation of the value of the condition to be controlled from the desired normal value for controlling the thermo-electric means additionally to position the device for returning the value of the condition to be controlled toward the desired normal value.

5. In combination, a device to be positioned in a plurality of positions for controlling the value of a condition, control means the state of which is varied in accordance with changes in the value of the condition, and having a normal state corresponding to a desired normal value of the condition, means, including follow-up means operated by said device, controlled by said control means for positioning said device in accordance with changes in the value of the condition to be controlled, thermo-electric means for additionally and directly operating said follow-up means, and means operated by said device for controlling the thermo-electric means additionally to position the device for returning the value of the condition to be controlled toward the desired normal value.

6. In combination, a device to be positioned in a plurality of positions for controlling the value of a condition, control means the state of which is varied in accordance with changes in the value of the condition, and having a normal state corresponding to a desired normal value of the condition, means, including follow-up means operated by said device, controlled by said control means for positioning said device in accordance with changes in the value of the condition to be controlled, thermostatic means for additionally and directly operating said follow-up means, heating means for the thermostatic means, and means operative as an incident to deviation of the value of the condition to be controlled from the desired normal value for varying the heating effect of the heating means additionally to position the device for returning the value of the condition to be controlled toward the desired normal value.

7. In combination, a device to be positioned in a plurality of positions for controlling the value of a condition, variable impedance means the impedance value of which is varied in accordance with changes in the value of the condition being controlled, means, including follow-up means operated by the device, controlled by variations in the impedance value of the variable impedance means for positioning said device in accordance with changes in the value of the condition to be controlled, thermo-electric means for additionally and directly operating said follow-up means, and means operative as an incident to deviation of the value of the condition to be controlled from the desired normal value for controlling the thermo-electric means additionally to position the device for returning the value of the condition toward the desired normal value.

8. In combination, a device to be positioned in a plurality of positions for controlling the value of a condition, variable impedance means the impedance value of which is varied in accordance with changes in the value of the condition being controlled, means, including follow-up means operated by the device, controlled by variations in the impedance value of the variable impedance means for positioning said device in accordance with changes in the value of the condition to be controlled, said follow-up means including variable impedance means operated by the device, thermo-electric means for additionally and directly operating said follow-up impedance means, and means operated by said device for controlling the thermo-electric means additionally to position the device for returning the value of the condition to be controlled toward the desired normal value.

9. In combination, a device to be positioned in a plurality of positions to control the value of a condition, control impedance means, means responsive to variations in the value of the condition to be controlled for varying the impedance value of the control impedance means, relay means in control of said device, balancing impedance means, means for adjusting the balancing impedance means upon operation of said device, thermo-electric means for additionally and directly adjusting said balancing impedance means, means operated by said device for controlling the thermo-electric means, and connections between the control impedance means, the balancing impedance means and the relay means.

10. In combination, a device to be positioned in a plurality of positions to control the value of a condition, control impedance means, means responsive to variations in the value of the condition to be controlled for varying the impedance value of the control impedance means, relay means in control of said device, balancing impedance means, means for adjusting the balancing impedance means upon operation of said device, thermostatic means for additionally and directly adjusting said balancing impedance means, heating means for the thermostatic means, means operative as an incident to deviation of the value of the condition to be controlled from the desired normal value for varying the heating effect of the heating means, and connections between the control impedance means, the balancing impedance means and the relay means.

11. In combination, a device to be positioned in a plurality of positions for controlling the value of a condition, control means the state of which is varied in accordance with changes in the value of the condition, and having a normal state corresponding to a desired normal value of the condition, means, including follow-up means operated by said device, controlled by said control means for positioning said device in accordance with changes in the value of the condition to be controlled, thermo-electric means for additionally and directly operating said follow-up means, means operative as an incident to deviation of the value of the condition to be controlled from the desired normal value for controlling the thermo-electric means additionally to position the device for returning the value of the condition to be controlled toward the desired normal value, and means for regulating the action of the thermo-electric means on the follow-up means.

12. In combination, a device to be positioned in a plurality of positions to control the value of a condition, control impedance means, means responsive to variations in the value of the condition to be controlled for varying the impedance value of the control impedance means, relay means in control of said device, balancing impedance means, means for adjusting the balancing impedance means upon operation of said device, thermo-electric means for additionally and directly adjusting said balancing impedance means, means operated by said device for controlling the thermo-electric means, connections between the control impedance means, the balancing impedance means and the relay means, and means for regulating the adjusting action of the thermo-electric means.

JAMES SCARTH LOCKE.